United States Patent
Santini

(10) Patent No.: US 7,969,683 B2
(45) Date of Patent: Jun. 28, 2011

(54) WRITE FIRST DESIGN FOR A PERPENDICULAR THIN FILM HEAD

(75) Inventor: Hugo Alberto Emilio Santini, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 1505 days.

(21) Appl. No.: 10/431,489

(22) Filed: May 6, 2003

(65) Prior Publication Data

US 2004/0223257 A1 Nov. 11, 2004

(51) Int. Cl.
*G11B 5/31* (2006.01)
(52) U.S. Cl. ........................................ 360/125
(58) Field of Classification Search ............. 360/125, 360/126
See application file for complete search history.

(56) References Cited

U.S. PATENT DOCUMENTS

| | | | |
|---|---|---|---|
| 4,277,809 A | 7/1981 | Fisher et al. | 360/131 |
| 5,073,836 A | 12/1991 | Gill et al. | 360/113 |
| 5,455,730 A | 10/1995 | Dovek et al. | 360/113 |
| 5,486,967 A | 1/1996 | Tanaka et al. | 360/113 |
| 5,668,689 A | 9/1997 | Schultz et al. | 360/113 |
| 5,691,867 A | 11/1997 | Onuma et al. | 360/126 |
| 5,710,683 A | 1/1998 | Sundaram | 360/126 |
| 5,822,153 A | 10/1998 | Lairson et al. | 360/104 |
| 5,901,432 A | 5/1999 | Armstrong et al. | 29/603.14 |
| 6,130,809 A | 10/2000 | Santini | 360/317 |
| 6,154,346 A | 11/2000 | Sasaki | 360/317 |
| 6,172,848 B1 | 1/2001 | Santini | 360/126 |
| 6,212,047 B1 | 4/2001 | Payne et al. | 360/318.1 |
| 6,259,583 B1 | 7/2001 | Fontana, Jr. et al. | 360/126 |
| 6,339,523 B1 | 1/2002 | Santini | 360/317 |
| 6,697,221 B2* | 2/2004 | Sato et al. | 360/126 |
| 6,754,947 B2* | 6/2004 | Stageberg et al. | 29/603.12 |
| 6,903,900 B2 | 6/2005 | Sato et al. | 360/126 |
| 6,943,988 B2* | 9/2005 | Ueyanagi | 360/126 |
| 6,954,340 B2* | 10/2005 | Shukh et al. | 360/317 |
| 2002/0176214 A1* | 11/2002 | Shukh et al. | 360/317 |
| 2003/0137779 A1* | 7/2003 | Santini et al. | 360/317 |
| 2004/0196589 A1* | 10/2004 | Lille | 360/125 |

FOREIGN PATENT DOCUMENTS

| | | |
|---|---|---|
| JP | 60-177420 | 9/1985 |
| JP | 1155510 A | 6/1989 |
| JP | 04-216311 | 8/1992 |
| JP | 4286702 A | 10/1992 |
| JP | 06-295418 | 10/1994 |
| JP | 2001-101612 | 9/1999 |
| JP | 2003-16608 | 6/2001 |

OTHER PUBLICATIONS

Japanese Office Action from Japanese Application No. 2004-129406 mailed on Dec. 9, 2008.

* cited by examiner

*Primary Examiner* — Mark Blouin
(74) *Attorney, Agent, or Firm* — Zilka-Kotab, PC

(57) ABSTRACT

A magnetic head structure for perpendicular recording and reading. The head structure includes a write head portion for writing data to magnetic media via lines of flux oriented substantially perpendicular to a surface of the media facing the write head portion. The write head portion includes a first pole piece having a first pole tip, a probe pole piece with a probe pole tip for emitting magnetic flux, an insulation stack positioned between the pole pieces, and one or more write coils embedded in the insulation stack. A read head portion that has been fabricated after the write head portion is coupled to the write head portion.

18 Claims, 13 Drawing Sheets

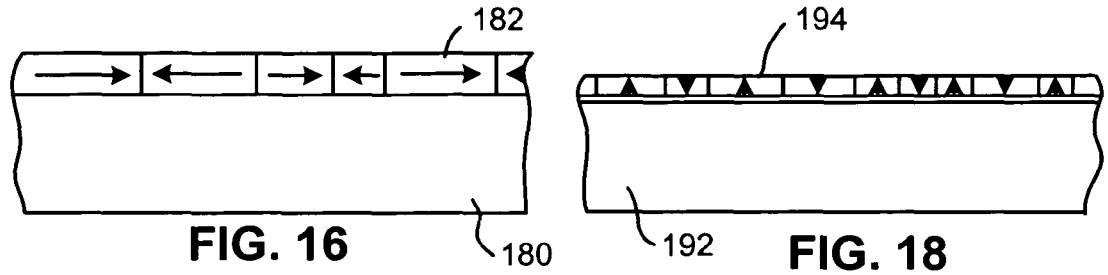
FIG. 16 (PRIOR ART)
FIG. 18
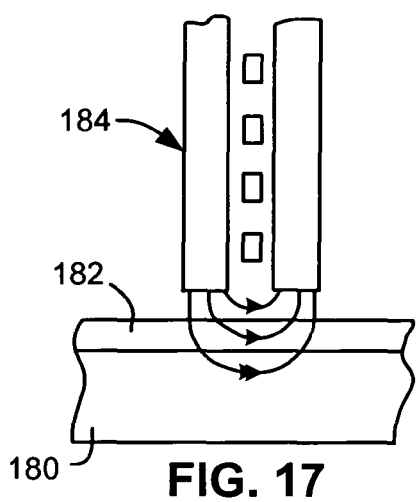
FIG. 17 (PRIOR ART)
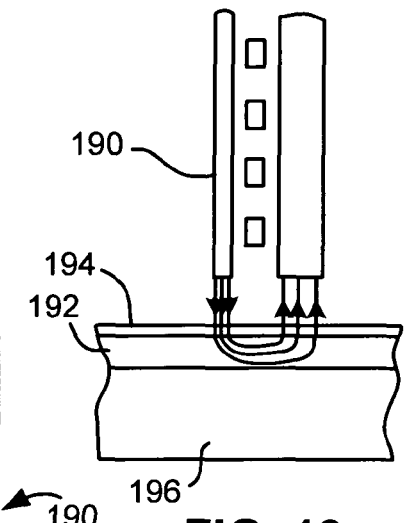
FIG. 19
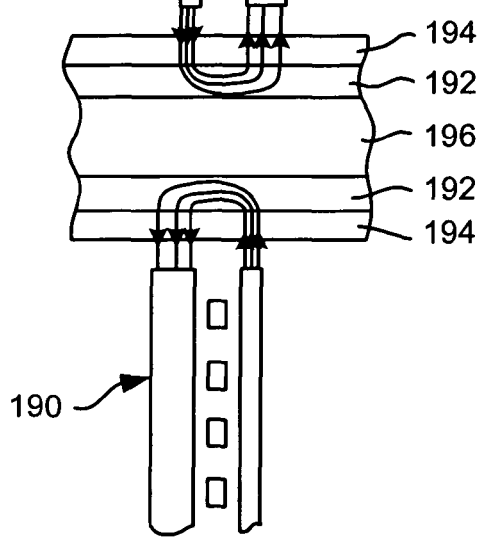
FIG. 20

WRITE FIRST DESIGN FOR A PERPENDICULAR THIN FILM HEAD

FIELD OF THE INVENTION

The present invention relates to thin film magnetic heads, and more particularly, this invention relates to a head with a write head positioned under a read head.

BACKGROUND OF THE INVENTION

In a typical head, an inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height, for the prior art designs, is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS and a predictable size. This definition is difficult to achieve because the second pole tip is typically formed along with the yoke after the formation of the first insulation layer, the coil layer and the second and third insulation layers. Each insulation layer includes a hard-baked photoresist having a sloping front surface.

After construction, the first, second and third insulation layers present front sloping surfaces which face the ABS. The ZTH defining layer rises from a plane normal to the ABS at an angle (apex angle) to the plane. After hard baking of the insulation layers and deposition of a metallic seedlayer the sloping surfaces of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography light imaging step, ultraviolet light is directed vertically through slits in an opaque mask, exposing areas of the photoresist which are to be removed by a subsequent development step. One of the areas to be removed is the area where the second pole piece (pole tip and yoke) is to be formed by plating. Unfortunately, when ultraviolet light strikes the sloping surfaces of the insulation layers in a flaring region of the second pole piece, the ultraviolet light is reflected forward, toward the ABS, into photoresist areas at the sides of the second pole tip region. After development, the side walls of the photoresist extend outwardly from the intended ultraviolet pattern, causing the pole tip plated therein to be poorly formed. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the amount of flux reaching the recording medium.

The high profile of the insulation stack causes another problem after the photoresist is spun on a wafer. When the photoresist is spun on a wafer it is substantially planarized across the wafer. The thickness of the resist in the second pole tip region is higher than other regions of the head since the second pole tip is substantially lower on the wafer than the yoke portion of the second pole piece. During the light exposure step the light progressively scatters in the deep photoresist like light in a body of water causing poor resolution during the light exposure step.

Another prior art scheme for minimizing the reflective notching and poor resolution problems is to construct the high resolution pole tip atop a planarized surface. The bottom second pole tip is constructed first, before the insulation layers to eliminate the reflective notching problem. After forming the first high resolution first pole piece layer and the write gap layer, processing can proceed to make the coil layer and the second and third insulation layers. The top second, wider, pole tip is then stitched (connected) to the bottom second pole tip and extends from the ABS to the back gap. Since the bottom second pole tip is well-formed and its size predictable, this fabrication method is an advance on the longitudinal head design. However, with this head, the ZTH is dependent upon the location of the insulation layer with respect to the bottom high resolution pole tip. Since the bottom pole tip has to be long enough to provide a sufficient stitching area, this length may result in undesirable flux leakage between the first and second pole pieces. Since the top second pole tip is typically wider than the bottom high resolution pole tip, the second pole piece has a T-shape at the ABS. The upright portion of the T is the front edge of the high resolution pole tip, and the cross of the T is the front edge of the top second pole tip. A problem with this configuration is that during operation, flux fringes from the outer corners of the top second pole tip to a much wider first pole piece at the ABS, causing adjacent tracks to be overwritten.

In another prior art embodiment, the high resolution pole tip is placed atop the stack. Once the high resolution second pole tip is formed, it is desirable to notch the underlying first pole tip of the first pole piece opposite the first and second corners at the base of the second pole tip so that flux transfer between the pole tips does not stray beyond the track width defined by the bottom second pole tip. Notching provides the first pole piece with a track width that substantially matches the track width of the high resolution second pole tip. A prior art process for notching the first pole piece entails ion beam milling the gap layer and the first pole piece, employing the bottom second pole tip as a mask. The gap layer is typically alumina and the first and second pole pieces and pole tips are typically Permalloy (NiFe). The alumina mills more slowly than the Permalloy; thus the top of the bottom second pole tip and a top surface of the first pole piece are milled more quickly than the gap layer. Further, during ion milling, there is much redeposition (redep) of alumina on surfaces of the workpiece. In order to minimize redep, the milling ion beam is typically directed at an angle to a normal through the layers, which performs milling and cleanup simultaneously. The gap layer in the field remote from the first and second corners of the bottom second pole tip is the first to be milled because of a shadowing effect at the first and second corners caused by the bottom second pole tip when the ion beam is angled. In this case, the ion stream will overmill the first pole piece before the gap layer is removed adjacent the first and second corners of the bottom second pole tip in the region where the notching is to take place. After the gap layer is removed above the sites where the notching is to take place, ion milling continues in order to notch the first pole piece. Overmilling of the first pole piece continues to take place in the field beyond the notches, thereby forming surfaces of the first pole piece that slope downwardly from the notches. As is known, such overmilling of the first pole piece can expose leads to the MR sensor or the wider head's coils, thereby rendering the head inoperative.

Even if overmilling of the first pole piece can be controlled, there is potentially a more troublesome problem, namely overmilling the top of the high resolution second pole tip when the unwanted portions of the gap layer are milled and notches are formed. In order to compensate for this overmilling, the aspect ratio (ratio of thickness of photoresist to track width of the high resolution second pole tip) is increased so that a top portion of the top of high resolution bottom second pole tip can be sacrificed during the milling steps. When the aspect ratio is increased, definition of the high resolution second pole tip is degraded because of the thickness of the photoresist, discussed hereinabove, resulting in track overwriting.

Another problem with the prior art merged MR head is that the profile of the MR sensor between the first and second gap layers is replicated through the second shield/first pole piece layer to the write gap layer causing the write gap layer to be slightly curved concave toward the MR sensor. When the write head portion of the merged MR head writes data the written data is slightly curved on the written track. When the straight across MR sensor reads this curved data there is progressive signal loss from the center of the data track toward the outer extremities of the data track.

All merged magnetic heads have a separation between the read and write gaps. This separation causes misregistration between the read and write gaps when the magnetic head is located at outer tracks on the magnetic disk. In the magnetic disk drive, an actuator swings the magnetic head across the rotating disk to various circular tracks on the disk. At the innermost track the read and write gaps are substantially aligned with one another and there is substantially no misregistration. At the innermost track the read gap follows within the track written by the write gap. However, when the actuator swings the magnetic head to the outermost track the read and write gaps are misaligned with respect to the track. If the write gap is within the track being written the read gap may be partially in the track and partially in an adjacent track. The misregistration increases with an increase in the separation between the read and write gaps. In magnetic heads where the write head is constructed before the read head the profile of the insulation stack of the write head raises the height of the first shield layer of the read head. It would be desirable if this profile could be reduced so that the read and write gaps are closer together.

Still another problem with prior art magnetic heads is that heating of high magnetic moment pole tips risks damage to the read sensor of the underlying read head. A high magnetic material is $Ni_{45}Fe_{55}$ as compared to $Ni_{80}Fe_{20}$. Pole tips constructed of high magnetic material are desirable because they will conduct higher flux density without saturating. Because the read head is placed under the write head while sharing the second shield/first pole tip elements (merged design), the read head is exposed to intense flux variations during the operation of the pole tips. This can result in damage and ultimate failure of the read sensor.

Heat also causes problems during use of the head. All of the coils are found in the write head. Modern disks are made with higher coercivity. To write to disks with high coercivity, more moment must come from the head, so more current must pass through the coils. The increased current generates more heat, which causes the copper in the coils to expand, causing the materials in front of them to protrude. Further, the coils are typically sandwiched between photoresist, which has less than ½ the expansion coefficient of Cu, resulting in an uneven air bearing surface (ABS). The ferromagnetic element also protrudes when heated. To compensate for protrusion, more flying gap is needed between the disk and head, resulting in lower resolution. This in turn lowers the maximum disk density, as the head needs to be very close to the disk for high areal density. Thus it is desirable to decrease heat to reduce expansion of the head layers. To provide the required read current with lower heat, adding additional turns to the coils has been attempted, but this increases the size of the head. While more turns can carry more current, this increases reluctance, so more magnetic moment is needed because there are more losses. Making the copper coils bigger with less separation between the coils decreases parasitic resistance and thus produces less heat, but at some point the coil becomes difficult to fabricate because after electroplating the copper, an ion milling process or sputtering process must be used to remove the Cu seed layer that was used to nucleate the copper during the electroplating operation. If the coils are too close together, the ions can't penetrate the gaps to clean up the seed layer, which ultimately has the effect of shorting the coil.

Furthermore, for efficiency, inductive heads are now being designed with very short distance between the ABS and the closure back gap. Patents on this concept include U.S. Pat. No. 6,259,583 which uses a pedestal-like structure to bring the coils up to 4 μm from the ABS. However, by having the coils so close to the ABS and the pitch of the coils very small, the heat dissipation over such small area creates thermal protrusion causing unwanted larger magnetic separation between the disk and head.

What is needed is a way to reduce the heat in the write head (i.e., improve heat dissipation) in order to keep the protrusion under control while avoiding the aforementioned problems.

Yet another problem is that during fabrication, the write head is formed last. As touched on above, the write head contains the most difficult layers to fabricate, thereby increasing the chance of error. For instance, the write head has many layers of thick dissimilar material, some hard and some soft. Each of these requires special processing (heating, milling, etc.) are prone to errors and/or can damage existing layers. Other difficulties arise when constructing the read portion which include bad imaging, bad composition when plating, smudges, lint, residue from prior processes, scratching, etc. If these difficulties extend to the write head, an error could occur during fabrication of the write head, so the entire wafer may have to be discarded, causing loss of precious time as well as substantial sums of money.

What is needed is a way to fabricate the most difficult layers first, thereby minimizing loss in case of error. This means fabricating the write head first.

Prior art U.S. Pat. No. 6,130,809 discloses a longitudinal write head placed under a read head. Because the head is designed for longitudinal recording, inherent with that concept is the need to produce very thick pole tips with large aspect ratio demands (>20:1). It also precludes the use of vacuum deposited films for the poles because it would require patterning using ion milling incapable of producing such aspect ratios.

A further problem encountered in the prior art, and particularly in longitudinal writing, is fringing fields. To increase bit density, tracks must be positioned very closely together. Similarly, the bit to bit density must be high. The close proximity of tracks and bits increases the risk of fringe writing. As areal density increases, the magnetic moment of the disk increases. To abate the paramagnetic limit of the media, more magnetic flux must be emitted from the pole tip because it also needs much thinner write gaps to increase the on-track bit density. This further increases the size of the fringing fields.

What is therefore needed is a perpendicular recording head, and process for manufacturing the same, that overcomes the problems inherent in the prior art.

SUMMARY OF THE INVENTION

The present invention solves the problems described above by providing standard and thin film magnetic head structures for perpendicular recording and reading. One head structure includes a write head portion for writing data to magnetic media via lines of flux oriented substantially perpendicular to a surface of the media facing the write head portion. The write head portion includes a first pole piece having a first pole tip, a probe pole piece with a probe pole tip for emitting magnetic flux, an insulation stack positioned between the pole pieces, one or more write coils embedded in the insulation stack, and a shaping layer positioned between the second pole piece and the insulation stack for focusing flux to the probe pole tip. A read head portion that has been fabricated after the write head portion is coupled to the write head portion. In one embodiment, the top pole piece functions as a shield layer for the read portion. In another embodiment, the read head portion includes first shield layer separated from the top pole layer, and a sensor positioned therebetween.

The write head portion is preferably positioned between the read head portion and a slider. This aids in conducting heat from the write head portion by allowing the slider to function as a heat sink. Also preferably, the probe pole piece is constructed at least in part of a deposited (vacuum deposited, plated, etc.) film that has been ion-milled. A preferred aspect ratio of the probe pole tip is less than 5:1.

A method for constructing a magnetic head for perpendicular recording and reading includes fabricating a probe pole piece having a probe pole tip for writing data to magnetic media via lines of flux oriented substantially perpendicular to a surface of magnetic media facing the write head portion. An insulation stack and write coil are fabricated above the probe pole piece, the write coil being embedded in the insulation stack. A second pole piece is fabricated above the insulation stack. Finally, a read head portion is fabricated above the second pole piece. Preferably, a shaping layer for focusing flux to the probe pole tip is formed between the probe pole tip piece and the insulation stack.

A magnetic storage system according to one embodiment includes magnetic media, a head for reading from and writing to the magnetic media via lines of flux oriented substantially perpendicular to a surface of the media facing the head, a slider for supporting the head, and a control unit coupled to the head for controlling operation of the head. The magnetic media preferably has a magnetically hard first layer positioned towards the head, and a magnetically soft second layer positioned behind the first layer.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 16 is a schematic representation in section of a recording medium utilizing a longitudinal recording format;

FIG. 17 is a schematic representation of a conventional magnetic recording head and recording medium combination for longitudinal recording as in FIG. 16.

FIG. 18 is a magnetic recording medium utilizing the perpendicular recording format of the present invention.

FIG. 19 is a schematic representation of the improved recording apparatus of the present invention illustrating a recording head and recording medium combination for perpendicular recording on one side;

FIG. 20 is a schematic representation of the improved recording apparatus of the present invention, similar to that of FIG. 19, but adapted for recording separately on both sides of the medium.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Magnetic Disk Drive

Figure 1:
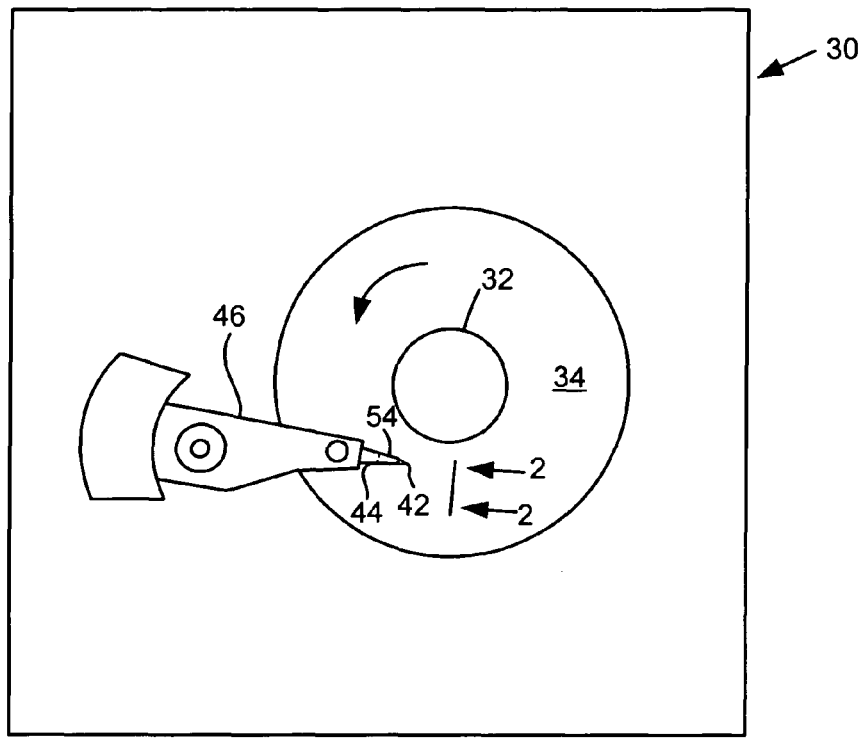
FIG. 1 is a planar view of an exemplary magnetic disk drive.
Figure 2:
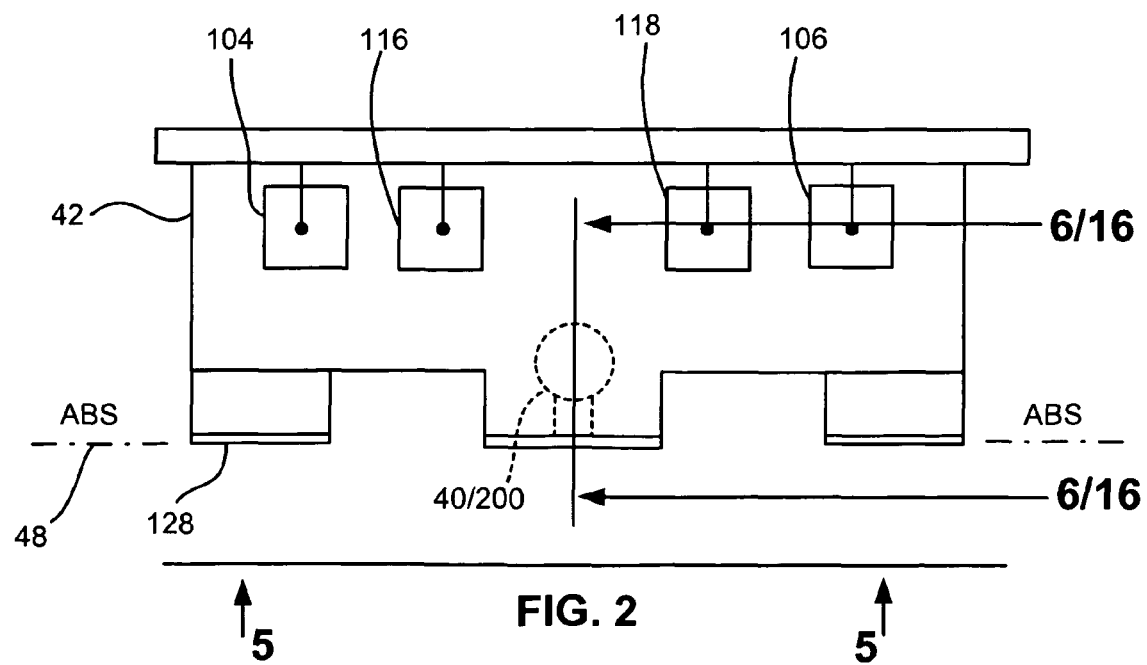
FIG. 2 is an end view of a slider with a magnetic head of the disk drive as seen in plane 2-2.
Figure 3:
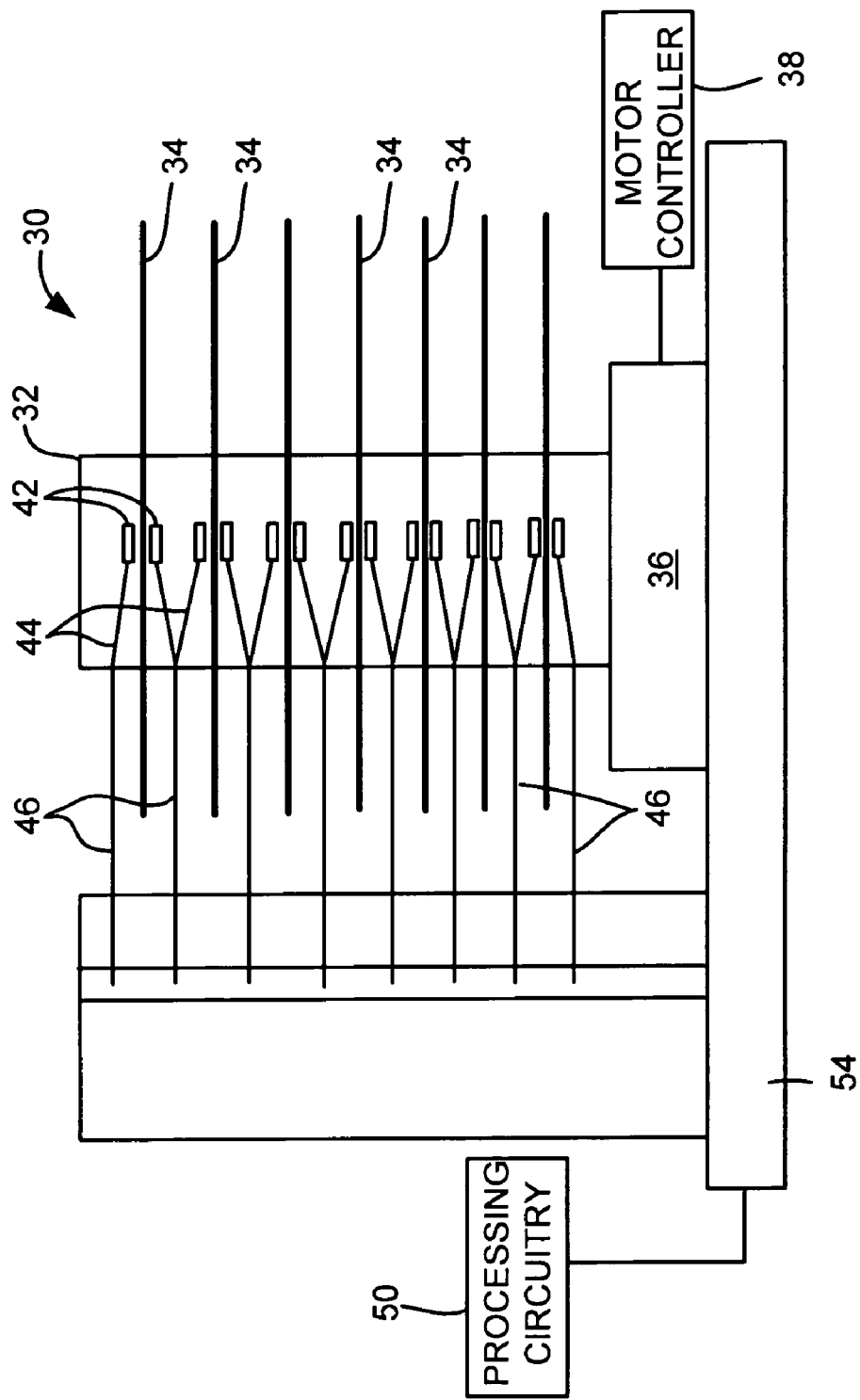
FIG. 3 is an elevation view of the magnetic disk drive wherein multiple disks and magnetic heads are employed.
Figure 4:
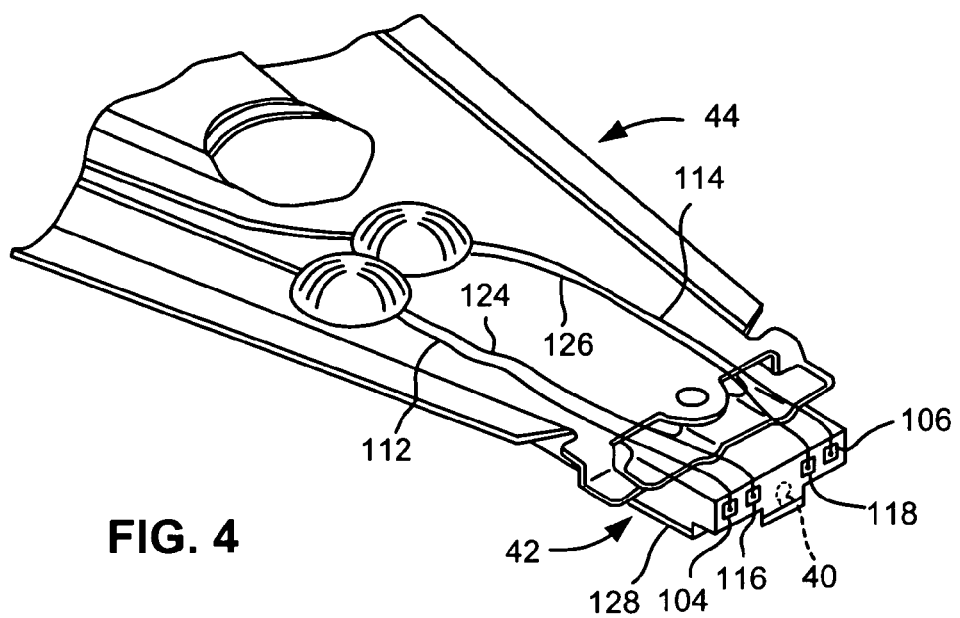
FIG. 4 is an isometric illustration of an exemplary suspension system for supporting the slider and magnetic head.

Referring now to the drawings wherein like reference numerals designate like or similar parts throughout the several views there is illustrated in FIGS. 1-3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity Direct Access Storage Device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
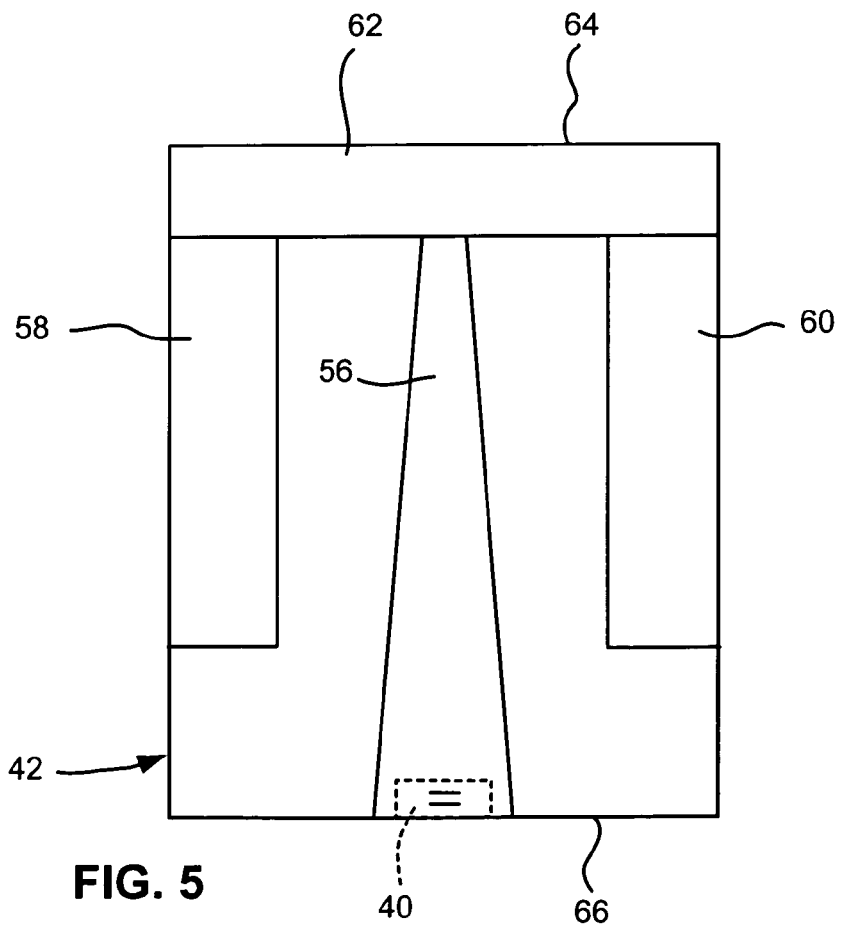
FIG. 5 is an ABS view of the magnetic head taken along plane 5-5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged MR Head

Figure 6:
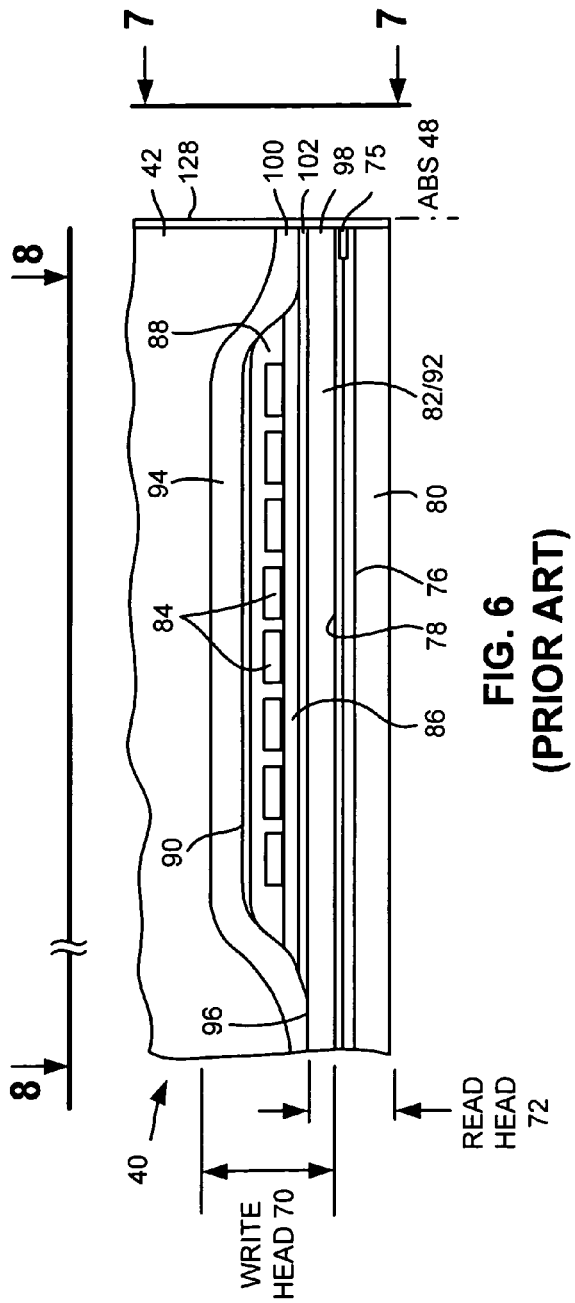
FIG. 6 is a partial view of the slider and a prior art magnetic head as seen in plane 6-6 of FIG. 2.
Figure 7:
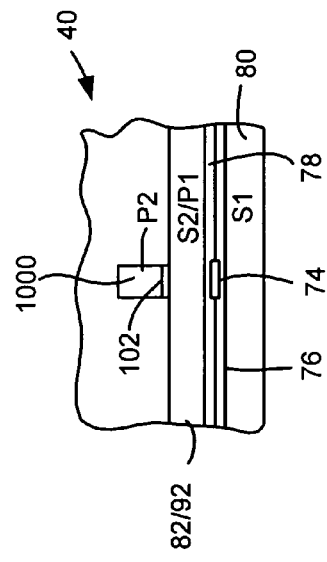
FIG. 7 is a partial ABS view of the slider taken along plane 7-7 of FIG. 6 to show the read and write elements of the prior art magnetic head.

FIG. 6 is a side cross-sectional elevation view of the merged MR head 40 which has a prior art write head portion 70 and a read head portion 72, the read head portion employing an MR sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

Figure 8:
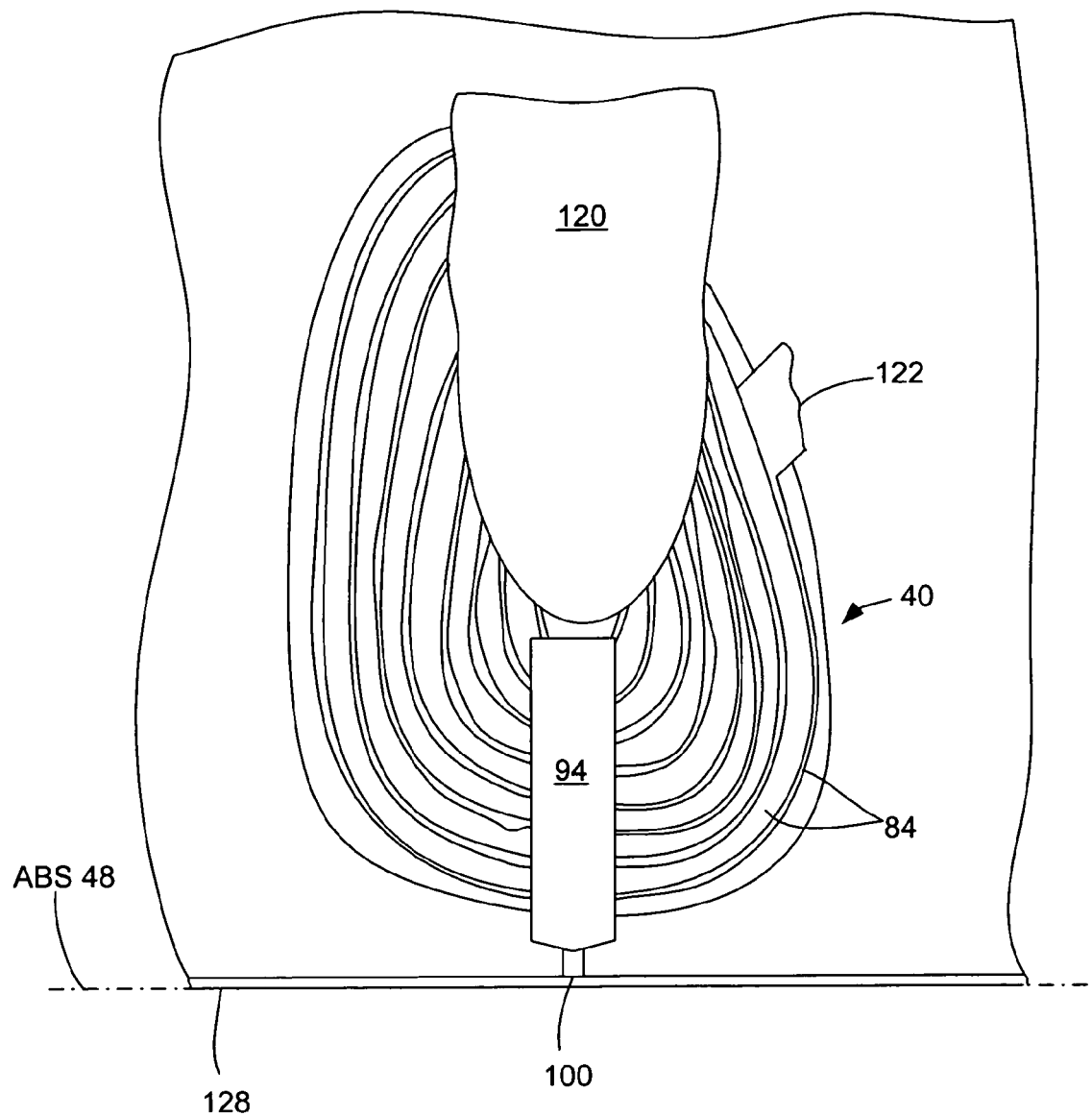
FIG. 8 is a view taken along plane 8-8 of FIG. 6 with all material above the second pole piece removed.

The prior art write head portion of the merged MR head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 40 employs a single layer 82/92 to serve a double function as a second shield layer for the read head and as a first pole piece for the write head. A piggyback MR head employs two separate layers for these functions.

Figure 9:
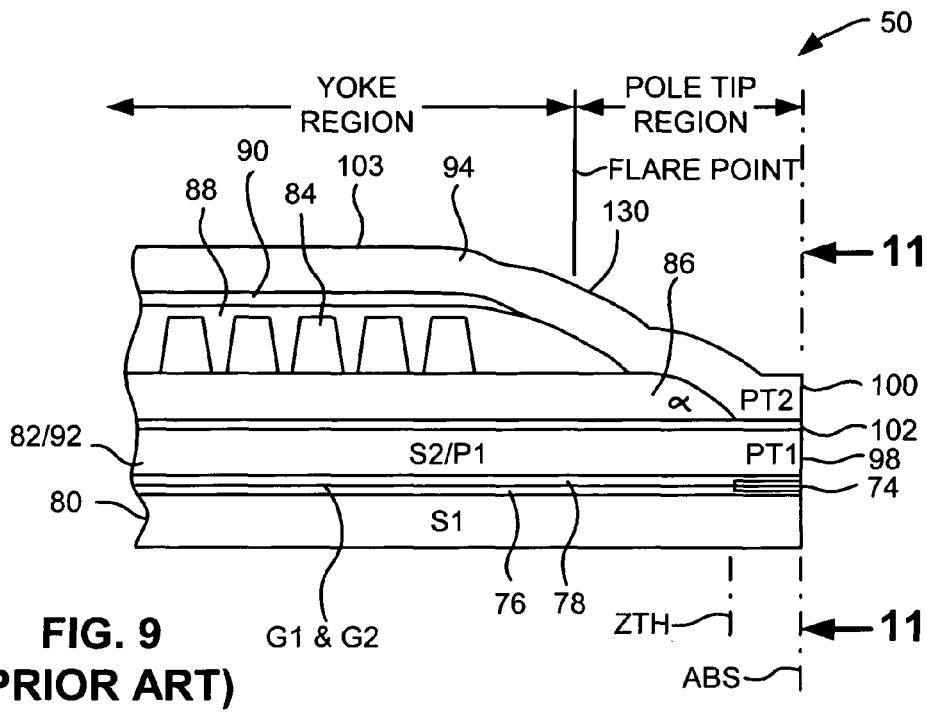
FIG. 9 is an enlarged front portion of the prior art magnetic head of FIG. 6 to show various details thereof.
Figure 12:
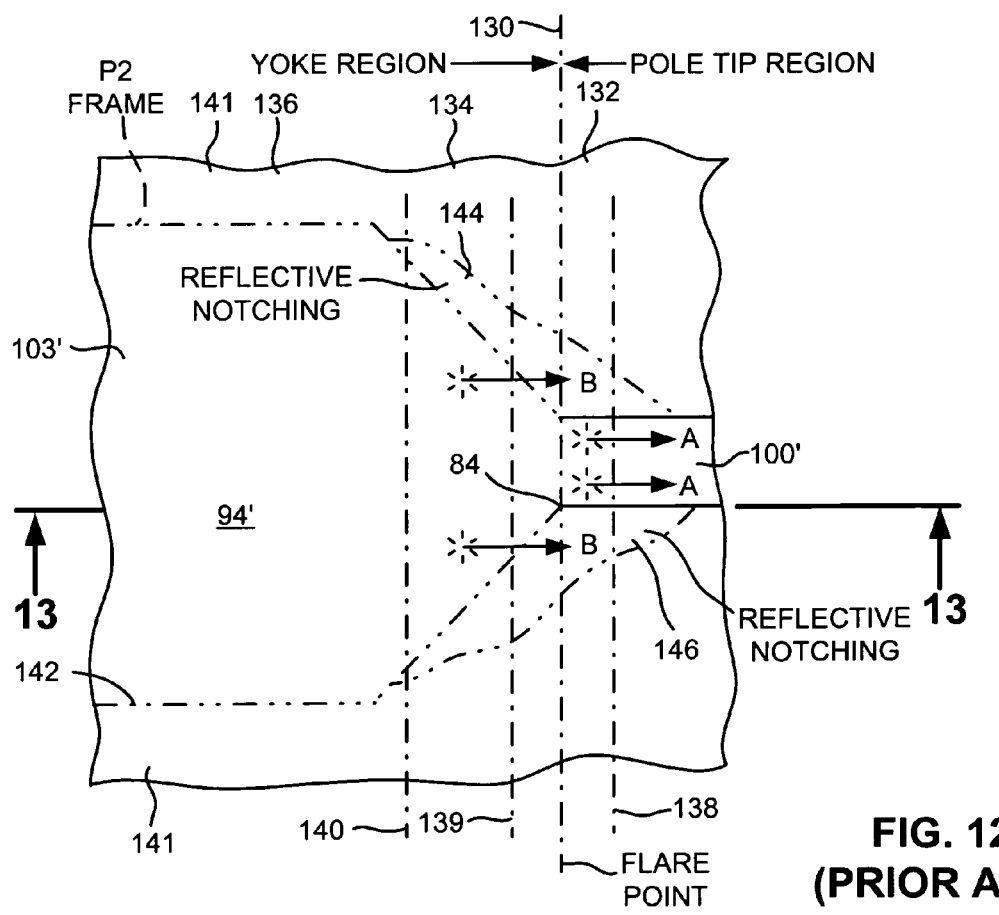
FIG. 12 is a view taken along plane 12-12 of FIG. 10.

As shown in FIG. 9, the second pole piece layer 94 has a pole tip region and a yoke region, the merging of these components being defined by a flare point 130 which is the location where the second pole piece layer 74 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
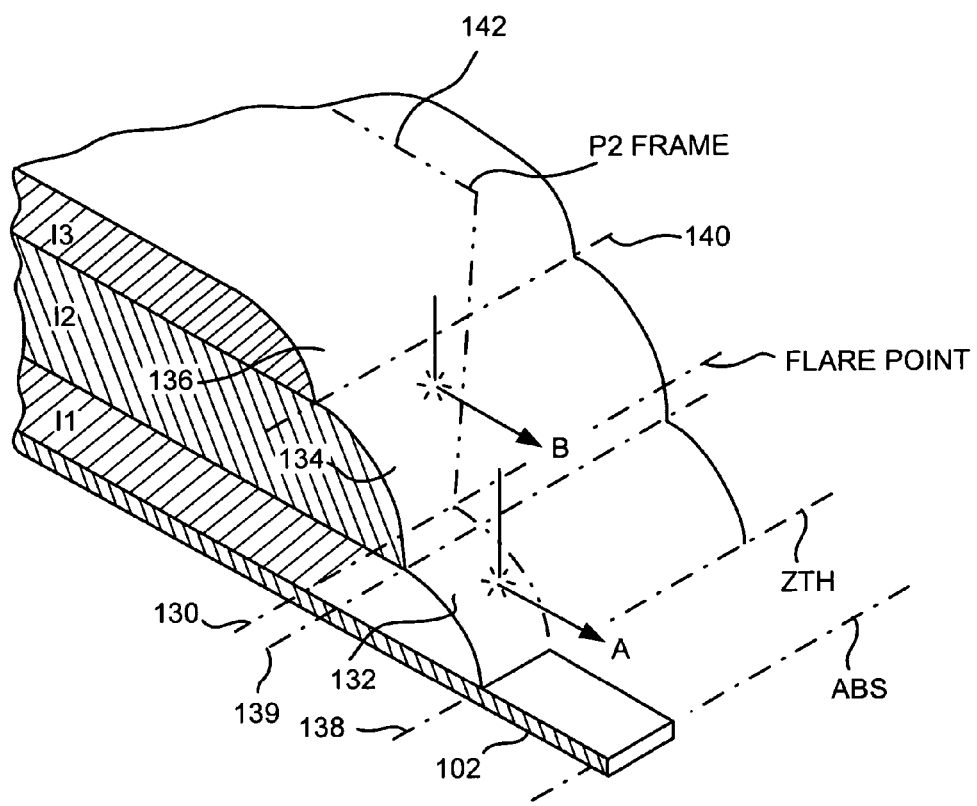
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 µm because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 µm) in order to reduce flux loss between the pole pieces before the fields reach the gap layer 102 at the ABS. In the prior art, locating the ZTH close to the ABS contributed to the aforementioned problem of fabricating a well-defined second pole tip 100.

Figure 10:
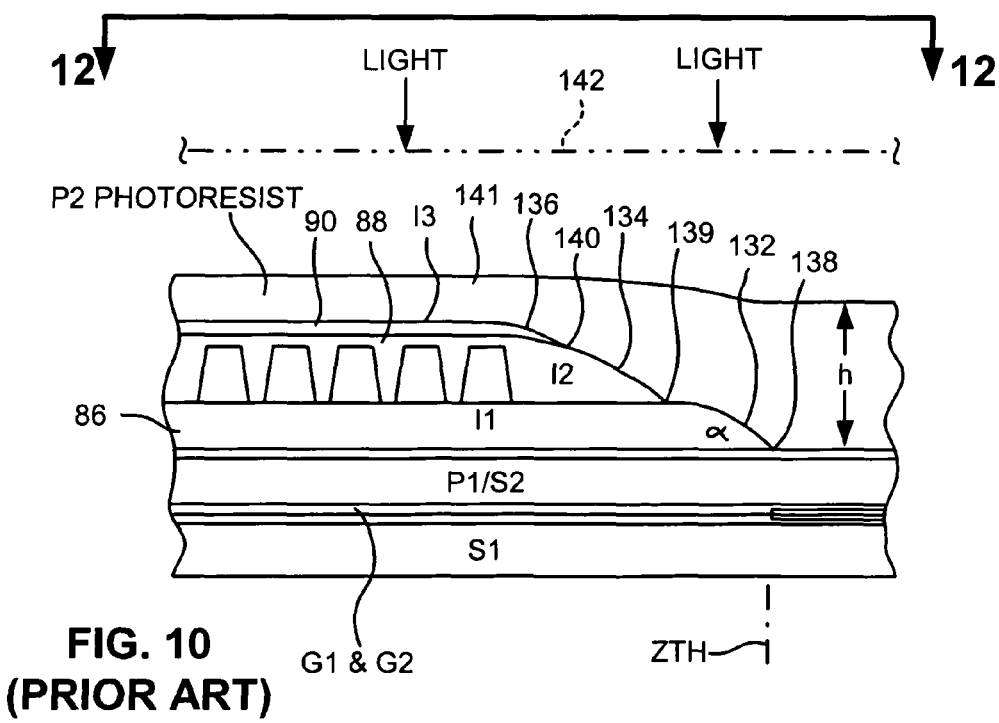
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10, the second pole piece is formed with a photoresist layer 141 that is spun on top of the partially completed head. The height of the photoresist layer may be as much as 12 μm thick in the pole tip region and is typically approximately 4.5 μm thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94' which comprises the second pole tip pattern 100' and the second pole piece yoke pattern 103'. This is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during the photo-imaging step of the photoresist, it is reflected at an angle of incidence from the insulation stack into the pole tip region without causing any reflective notching of the second pole tip. However, light ray B from the photo-imaging process is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
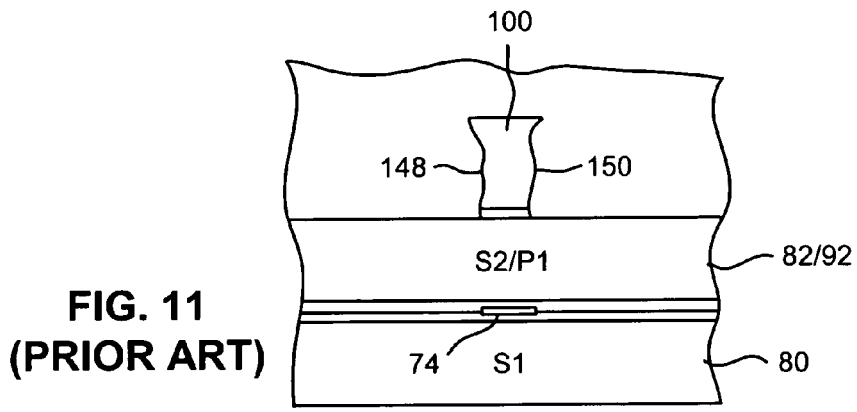
FIG. 11 is a view taken along plane 11-11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72. These poorly formed pole tips result in side writing of adjacent tracks.

Figure 14:
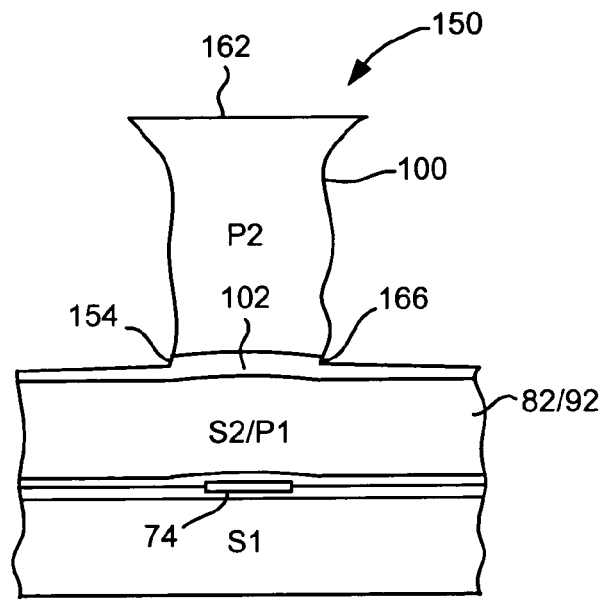
FIG. 14 is an ABS view of a prior art merged MR head before notching of the first pole piece.
Figure 15:
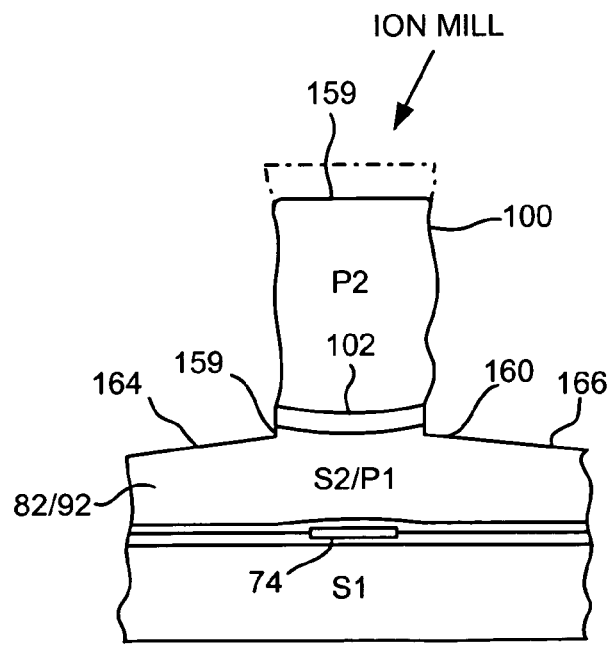
FIG. 15 is an ABS view of the merged MR head shown in FIG. 14 after ion milling to form the first pole piece with notches adjacent the second pole tip.

FIG. 14 is an ABS view of a prior art merged magnetic head 150 after a P2 seedlayer (not shown) has been removed by ion milling. It can be seen that the ion milling has slightly notched the gap layer 102 at 154 and 156. One method of notching the first pole piece layer 82/92 in the prior art is to ion mill through the gap layer into the first pole piece layer, as shown in FIG. 15. This notches the first pole piece layer at 159 and 160. Notching of the first pole piece layer 82/92 is desirable since it minimizes side writing between the second pole tip 100 and the first pole piece 82/92. Unfortunately, the process shown in FIG. 15 results in consumption of a top surface 159 of the second pole tip 100, as shown by the phantom lines in FIG. 15. Since ion milling is typically performed at an angle to a normal to the thin film layers, as shown in FIG. 15, the second pole tip 158 shadows the milling of the notching at 159 and 160 approximately 50% of the time while the workpiece is rotated. Consequently, the first pole piece 82/92 is overmilled, in locations 164 and 166 which extend in the field remote from the notches 159 and 160 respectively. This causes the first pole piece 82/92 to have downwardly sloping top surfaces 164 and 166, as shown in FIG. 15, which undesirably reduces the thickness of the first pole piece 82/92 in the field. This can potentially expose sensitive elements beneath the first pole piece 82/92 rendering the head inoperative. The gap layer 102 mills more slowly than the Permalloy (NiFe) of the first and second pole pieces which results in more rapid ion milling of the top 159 of the second pole tip 100 and the fields 164 and 166 of the first pole piece 82/92 than the gap layer 102.

It can be seen from FIG. 15 that the beginning thickness of the second pole tip layer 100 has to be thicker than the final height of the second pole tip layer at 159 in order to compensate for the top portion of the second pole tip layer consumed by ion milling. This then requires the photoresist mask to be thicker which increases the aforementioned problem of additional light scattering during the light photo-imaging step as the photoresist layer increases in depth. This means that the second pole tip cannot be constructed as narrow because of loss of definition during the photoresist patterning. FIG. 15 also shows the write gap 102 slightly curved due to the profile of the MR sensor being replicated through the second shield first pole tip layer 82/92 to the gap layer 102. Accordingly, it can now be seen that the prior art merged MR head suffers from the disadvantages of reflective notching of the second pole tip, loss of a top portion of the second pole tip upon notching the first pole piece and write gap curvature. These problems are overcome by the inverted merged MR head described hereinbelow.

Another problem with the prior art head in FIGS. 14 and 15 is that the write gap 102 has a curvature due to replication of the profile of the MR sensor by the second gap layer 78 and the second shield/first pole piece layer 82/92. As discussed hereinabove, this causes information to be written in a curve across a track which is inaccurately read by the straight MR sensor 74.

As mentioned above, prior art fabrication of DASD thin film heads have positioned the write heads above the read heads, except for U.S. Pat. No. 6,130,809 where the longitudinal write head is placed under the read head. Because the head in the patent is for longitudinal recording, inherent with that concept is the need to produce very thick pole tips with large aspect ratio demands (>20:1). It also precludes the use of vacuum deposited films for the poles because it would require patterning using Ion Milling incapable of producing such aspect ratios.

FIG. 16 illustrates, schematically, a conventional recording medium such as used with conventional magnetic disc recording systems. This medium is utilized for recording magnetic impulses in or parallel to the plane of the medium itself. The recording medium, a recording disc in this instance, comprises basically a supporting substrate 180 of a suitable non-magnetic material such as aluminum, with an overlying coating 182 of a suitable and conventional magnetic oxide dispersed in an appropriate resin binder.

In FIG. 17 is shown the operative relationship between a conventional recording/playback head 184, which may preferably be a thin film head, and a conventional recording medium, such as that of FIG. 16.

The Invention and Method of Construction

FIG. 18 illustrates schematically the orientation of magnetic impulses substantially perpendicular to the surface of the recording medium, generally in the manner provided for by the present invention. For such perpendicular recording the medium includes an under layer 192 of a material having a high magnetic permeability, preferably greater than 100, which suitably may be either a ferromagnetic or ferrimagnetic material, such as a permalloy material, iron, or the like. This under layer 192 is then provided with an overlying coating 194 of magnetic material preferably having a uniaxial anisotropy substantially perpendicular to the surface of the under layer 192.

Two embodiments of storage systems with perpendicular heads 190 are illustrated in FIGS. 18 and 19 (not drawn to scale). The recording medium illustrated in FIG. 19 includes both the high permeability under layer 192 and the overlying coating 194 of magnetic material described with respect to FIG. 18 above. However, both of these layers 192 and 194 are shown applied to a suitable substrate 196, which may desirably be an aluminum disc, although other material such as glass or synthetic resins may also be used.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 192 back to the return layer (P1) of the head 190.

FIG. 20 illustrates a similar structure in which the substrate 196 carries the layers 192 and 194 on each of its two opposed sides, with suitable recording heads 190 positioned adjacent the outer surface of the magnetic coating 194 on each side of the medium.

FIGS. 21-27 illustrate formation of a perpendicular head according to a preferred embodiment in which the head incorporates a perpendicular recording thin film head positioned under a thin film read head.

Figure 21:
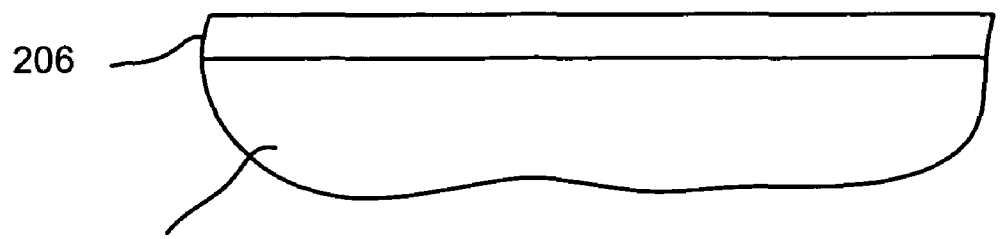
FIG. 21 is a partial ABS view of a probe/pole layer during construction of a head according to an embodiment of the present invention.

As shown in FIG. 21, a probe/pole layer 206 is fabricated on a suitable undercoat 207 such as alumina by depositing a full film layer (plated or vacuum deposited) onto the undercoat alumina 207. This layer in a preferred embodiment has a thickness of about 0.3 μm.

Figure 22:
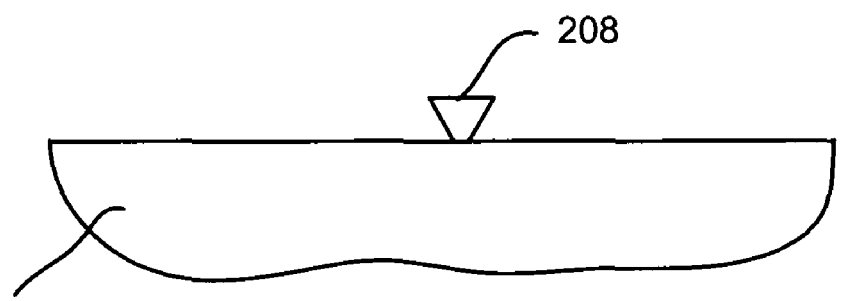
FIG. 22 is a partial side view of the probe pole tip remaining after milling of the probe/pole layer.
Figure 23:
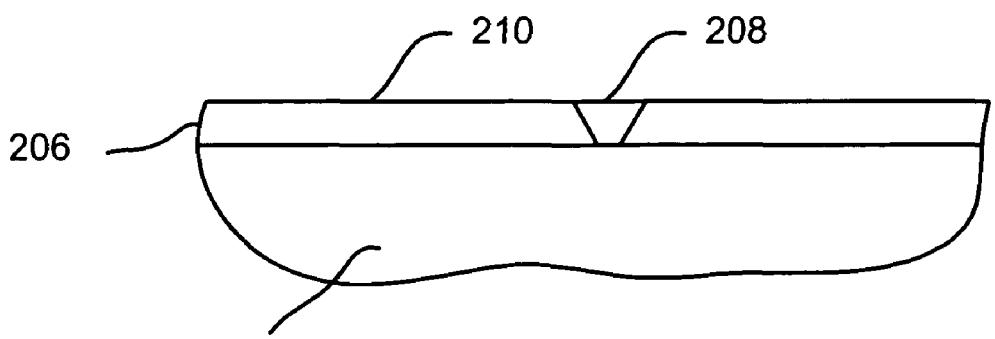
FIG. 23 is a partial ABS view of a completed planarized probe/pole layer.

As depicted in FIG. 22, a probe 208 is patterned from the raw probe/pole layer 206 preferably using an ion milling technique. Because the probe/pole layer 206 is the first layer, the ion milling does not cause damage to underlying head structures. The width of the probe pole tip 208 defines the track width. The probe pole tip 208 writes data to magnetic media via lines of flux oriented substantially perpendicular to the surface of the media that faces the head. The size of the probe pole tip 208 defines the track width. This more-focused flux permits use of media with track widths and, to some extent bit widths, which are much more narrow than conventional longitudinal-writing systems. Note that the thickness of the disk magnetic layer also controls the size of bits to some extent as well. Once the probe pole tip 208 is formed, thick alumina 210 or other suitable substance can be deposited and planarized via a Chemical Mechanical Planarization (CMP) technique, as shown in FIG. 23, to complete the probe pole layer 206.

Figure 24:
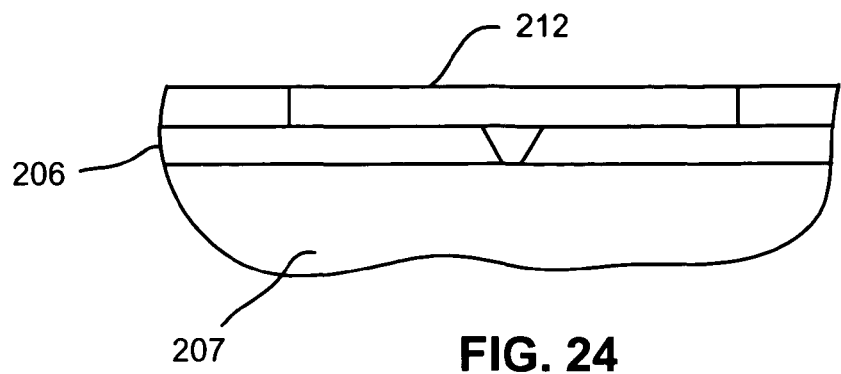
FIG. 24 is a partial ABS view of the structure of FIG. 23 with the addition of a shaping layer.

FIG. 24 illustrates addition of the shaping layer 212 that contributes to bringing magnetic flux to the pole 208. More particularly, the shaping layer brings flux to the probe pole tip to decrease the reluctance (MR) of the system, which in turn focuses flux down to a narrow point (like a funnel). Preferably, the shaping layer does not reach the ABS but is placed a very short distance into the head. This distance is now considered as a new form of ZTH. The shaping layer does not reach the ABS but is placed a very short distance into the head. As will be understood by those skilled in the art, the closer to the ABS and the shorter the distance of the narrow probe, the greater the efficiency of the head. A preferred material for the shaping layer is permalloy (80/20 NiFe).

Once the shaping layer 212 is made, gaps can be filled by a conventional process and the wafer is again planarized, preferably by using alumina and CMP.

Figure 25:
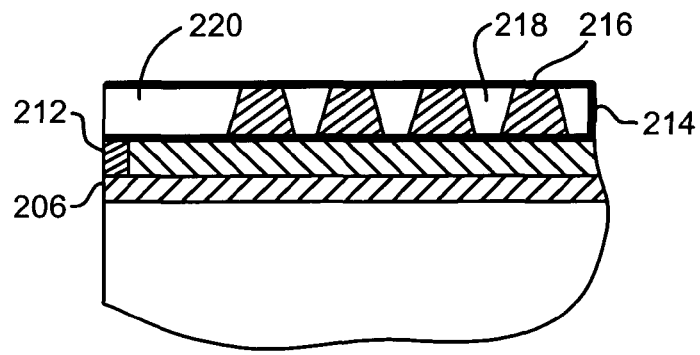
FIG. 25 is a partial cross sectional view of the structure of FIG. 24 with the addition of coils and insulation.

FIG. 25 is a side cross-sectional view of the wafer of FIG. 24 with the addition of coils and insulation. As shown in FIG. 25, the top of the shaping layer 212 is insulated using a suitable insulation 214 and the coils 216 are made in a conventional way or via the Damascene method. The coils 216 can be insulated between the turns using hard baked resist 218. The front of the coils 216 can be insulated up to the ABS via thick alumina 220. The structure is again planarized, creating a flat surface upon which to construct the P1 layer.

Figure 26:
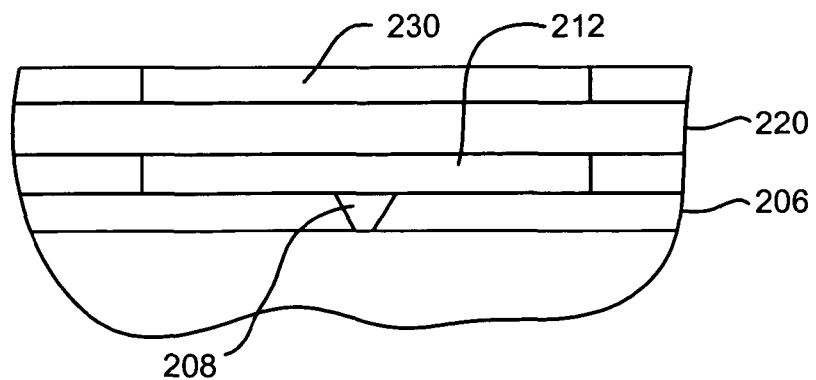
FIG. 26 is a partial ABS view of the structure of FIG. 25 with the addition of a P1 layer.

FIG. 26 depicts the wafer upon addition of a P1 layer 230. The P1 layer 230 reaches the ABS while functions as the return path of the write head's magnetic flux leaving the underlayer of the disk. Once the P1 layer 230 is constructed, gaps can be filled by a conventional process and the wafer is again planarized, preferably by using alumina and CMP.

Figure 27:
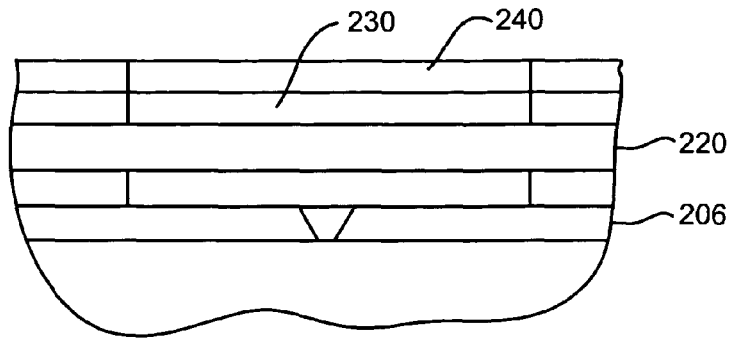
FIG. 27 is a partial ABS view of the structure of FIG. 25 with the addition of a shield layer.

FIG. 27 shows the wafer with a first shield (S1) layer 240 added. Note that because the S1 layer 240 is typically a very uncomplicated layer to make with little size dependence, it can be fabricated atop a wafer that is not completely planar (even after CMP planarization). Thus, the P1 layer need not be perfectly planarized. Once again the wafer is planarized to enable the standard fabrication of the read head (GMR or Tunnel) 242 (FIG. 28), and following the deposition of the second gap, the second shield (S2) layer 244 (FIG. 28) is fabricated.

Figure 28:
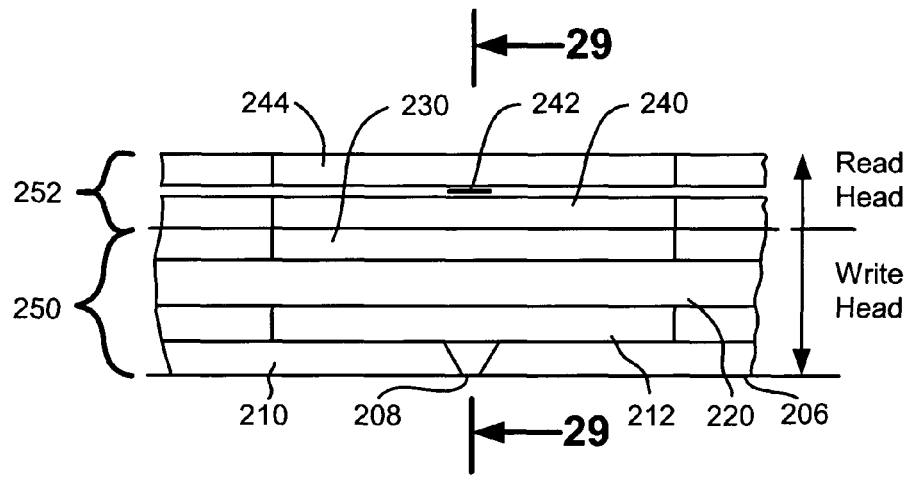
FIG. 28 a partial ABS view of the thin film head structure according to one embodiment.
Figure 29:
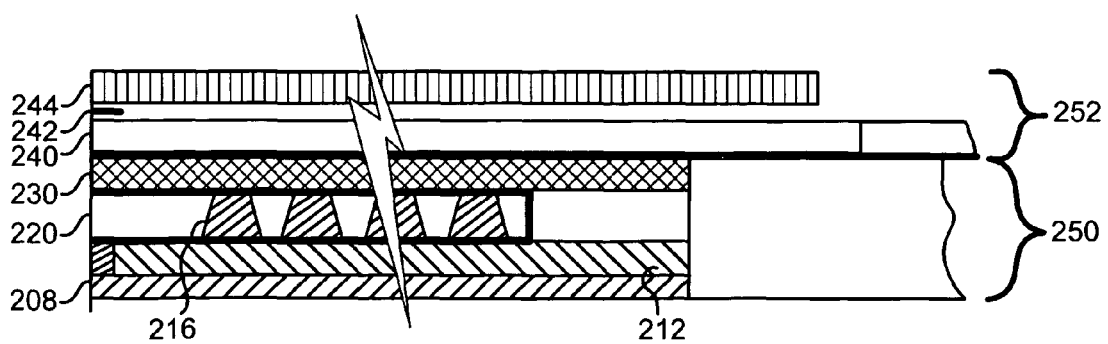
FIG. 29 a partial cross sectional view of the head structure taken along plane 29-29 of FIG. 28.

FIGS. 28-29 illustrate the completed structure according to a preferred embodiment, which incorporates a perpendicular recording thin film (write) head 250 positioned under a thin film read head 252. The combination of a perpendicular recording thin film head 250 placed under a thin film read head 252 provides the inherent benefits of producing the write head 250 first, whose demand for high temperature processing which would cause instability in the read head materials if they were fabricated first. Because the write pole/probe is fabricated first and it being the most demanding structure on the entire head, in the event of problems associated with its manufacture, the wafer could be reworked or rejected with minimal cost loss. If instead the pole/probe is created last, one could reject an almost finished wafer with a much larger cost loss.

The disclosed perpendicular design also brings together very efficient head performance, better heat dissipation, and very thin writer pole needs. Fewer coils are needed, as the shaping layer focuses flux into the probe pole. Thus, because the embodiments of the present invention use perpendicular recording resulting in a basically fringeless process, tighter tracks are possible.

As mentioned above, for efficiency, inductive heads are now being designed with a very short distance between the ABS and the closure back gap. By having the coils so close to the ABS and the pitch of the coils very small, the heat dissipation over such small area creates thermal protrusion causing unwanted larger magnetic separation between the disk and head. By placing the write heads first (and consequently near the heat-sinking slider), heat dissipation is improved, thereby helping to reduce the protrusion problem. Further, while the head in U.S. Pat. No. 6,259,583 uses a pedestal like structure to bring the coils up to 4 μm from the ABS, no pedestal is necessary in preferred embodiments of the present invention. In conventional heads, the P1 and P2 layers are wider than the corresponding layers in the disclosed embodiments, so side writing occurs. Fringing fields from conventional heads are up to 40% wider than those of perpendicular recording heads. As described above, the recording head does not require a pedestal according to preferred embodiments. In perpendicular recording, the flux jumps into the disk which acts as a pedestal to return flux back to the larger P1 layer. By removing the pedestal the flux is focused, and by having the head use the disk as a return layer, high resolution is guaranteed because the problems of conventional heads (fringing fields, heat, protrusion, etc.) are almost completely avoided.

Though the read head is now more separated from the heat sinking slider, the combined metallic components underneath act as an excellent heat sinking element. Again by fabricating the write head first, none of its fabrication demands for high temperature process are felt by the read head. The fact that the write head's more demanding layer (the probe poles) are much thicker than the K5 or K3 layers of the read heads it means that alignment targets will be of better resolution.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head structure for perpendicular recording and reading, comprising:
    a write head portion for writing data to magnetic media via lines of flux oriented substantially perpendicular to a surface of the media facing the write head portion, the write head portion including:
        a first pole piece, the first pole piece having a first pole tip;
        a probe pole piece, the probe pole piece having a probe pole tip for emitting magnetic flux;
        an insulation stack positioned between the pole pieces; and
        at least one write coil embedded in the insulation stack; and
    a read head portion; and
    a slider, the write head being positioned between the read head and the slider, and the probe pole piece being disposed between the first pole piece and the slider.

2. A magnetic head structure as recited in claim 1, further comprising a shaping layer positioned between the probe pole piece and the insulation stack, the shaping layer being for focusing flux to the probe pole tip.

3. A magnetic head structure as recited in claim 1, wherein the probe pole piece is constructed at least in part of a deposited film that has been ion-milled.

4. A magnetic head structure as recited in claim 1, wherein an aspect ratio of the probe pole tip is less than 10:1.

5. A magnetic head structure as recited in claim 1, wherein head portions are thin film heads.

6. A magnetic head structure as recited in claim 1, wherein the first pole piece functions as a shield layer for the read portion.

7. A magnetic head structure as recited in claim 1, wherein the read head portion includes first and second shield layers and a sensor positioned therebetween.

8. A magnetic head structure for perpendicular recording and reading, comprising:
    a thin film write head portion for writing data to magnetic media via lines of flux oriented substantially perpendicular to a surface of the media facing the write head portion, the write head portion including:
        a first pole piece, the first pole piece having a first pole tip;
        a probe pole piece, the probe pole piece having, a probe pole tip for emitting magnetic flux;
        an insulation stack positioned between the pole pieces;
        at least one write coil embedded in the insulation stack;
        a shaping layer positioned between the probe pole piece and the insulation stack, the shaping layer being for focusing flux to the probe pole tip;
    a thin film read head; and
    a slider, the write head being disposed between the read head and the slider, and the probe pole piece being disposed between the first pole piece and the slider.

9. A magnetic head structure as recited in claim 8, wherein the probe pole piece is constructed at least in part of a deposited film that has been ion-milled.

10. A magnetic head structure as recited in claim 8, wherein an aspect ratio of the probe pole tip is less than 10:1.

11. A magnetic head structure as recited in claim 8, wherein an aspect ratio of the probe pole tip is less than 5:1.

12. A magnetic head structure as recited in claim 8, wherein the first pole piece functions as a shield layer for the read portion.

13. A magnetic head structure as recited in claim 8, wherein the read head portion includes first and second shield layers and a sensor positioned therebetween.

14. A magnetic storage system, comprising:
    magnetic media;
    at least one head for reading from and writing to the magnetic media, each head having:
        a write head portion for writing data to the medium via lines of flux oriented substantially perpendicular to a surface of the media facing the write head portion, the write head portion including:
            a first pole piece, the first pole piece having a first pole tip;
            a probe pole piece, the probe pole piece having a probe pole up for emitting magnetic flux;
            an insulation stack positioned between the pole pieces; and
            at least one write coil embedded in the insulation stack;
        a read head portion; and
        a slider, the write head being disposed between the read head and the slider, and the probe pole piece being located between the first pole piece and the slider.

15. A storage system as recited in claim 14, further comprising a shaping layer positioned between the probe pole piece and the insulation stack, the shaping layer being for focusing flux to the probe pole tip.

16. A storage system as recited in claim 14, wherein the probe pole piece is constructed at least in part of a deposited film that has been ion-milled.

17. A storage system as recited in claim 14, wherein an aspect ratio of the probe pole tip is less than 10:1.

18. A storage system as recited in claim 14, wherein the magnetic media has a magnetically hard first layer positioned towards the at least one head, and a magnetically soft second layer positioned behind the first layer.

* * * * *